(12) United States Patent
Fegely

(10) Patent No.: US 9,997,807 B2
(45) Date of Patent: Jun. 12, 2018

(54) VIBRATION RESISTANT VALVE ASSEMBLY FOR LEAD ACID BATTERIES

(71) Applicant: East Penn Manufacturing Co., Lyon Station, PA (US)

(72) Inventor: Ralph Fegely, Lenhartsville, PA (US)

(73) Assignee: East Penn Manufacturing Co., Lyon Station, PA (US)

( * ) Notice: Subject to any disclaimer, the term of this patent is extended or adjusted under 35 U.S.C. 154(b) by 114 days.

(21) Appl. No.: 14/824,887

(22) Filed: Aug. 12, 2015

(65) Prior Publication Data

US 2016/0190655 A1 Jun. 30, 2016

Related U.S. Application Data

(60) Provisional application No. 62/096,621, filed on Dec. 24, 2014.

(51) Int. Cl.
| | | |
|---|---|---|
| *H01M 10/06* | (2006.01) | |
| *H01M 10/12* | (2006.01) | |
| *F16K 17/02* | (2006.01) | |
| *H01M 2/12* | (2006.01) | |
| *B01D 46/54* | (2006.01) | |
| *B01D 63/00* | (2006.01) | |
| *F16K 24/04* | (2006.01) | |
| *F16K 47/08* | (2006.01) | |
| *F16L 15/08* | (2006.01) | |
| *F16L 23/00* | (2006.01) | |

(52) U.S. Cl.
CPC ........ *H01M 10/121* (2013.01); *B01D 46/543* (2013.01); *B01D 63/00* (2013.01); *F16K 17/02* (2013.01); *F16K 24/04* (2013.01); *F16K 47/08* (2013.01); *F16L 15/08* (2013.01); *F16L 23/003* (2013.01); *H01M 2/1229* (2013.01); *H01M 2/1252* (2013.01); *H01M 2/1264* (2013.01)

(58) Field of Classification Search
CPC .................................................... H01M 10/121
See application file for complete search history.

(56) References Cited

U.S. PATENT DOCUMENTS

| | | |
|---|---|---|
| 1,583,871 A | 5/1926 | Davis |
| 1,977,506 A | 10/1934 | Dodds |
| 2,049,201 A | 7/1936 | Dunzweiler et al. |
| 2,141,621 A | 12/1938 | Setzer |
| 2,160,806 A | 6/1939 | Aikenhead |

(Continued)

FOREIGN PATENT DOCUMENTS

| | | |
|---|---|---|
| GB | 2061600 A | 4/1980 |
| WO | 9941798 A1 | 8/1999 |
| WO | 0036684 A1 | 6/2000 |

OTHER PUBLICATIONS

PCT Notification, International Search Report and Written Opinion, dated Mar. 18, 2016, 11 pages.

(Continued)

*Primary Examiner* — Jacob Marks
(74) *Attorney, Agent, or Firm* — Barley Snyder

(57) ABSTRACT

A battery valve assembly is disclosed having a body with a first end and an opposite second end. The body includes a receiving passageway extending through the body from the first end to the second end, and an elongated base positioned proximate to the second end. The valve assembly also includes a hydrophobic barrier.

15 Claims, 6 Drawing Sheets

(56) References Cited

U.S. PATENT DOCUMENTS

| | | | |
|---|---|---|---|
| 2,646,459 A | | 7/1953 | Gill |
| 2,889,392 A | | 6/1959 | Bates |
| 2,926,211 A | | 2/1960 | Sturges |
| 3,661,651 A | | 5/1972 | Nishimura et al. |
| 4,294,895 A | | 10/1981 | Atkins |
| 5,380,604 A | | 1/1995 | Hampe et al. |
| 6,110,617 A | * | 8/2000 | Feres .................. H01M 2/1217 428/66.4 |
| 6,120,931 A | | 9/2000 | Fossati et al. |
| 6,660,425 B2 | | 12/2003 | Jones et al. |
| 6,881,513 B2 | | 4/2005 | Dasgupta et al. |
| 7,101,640 B1 | * | 9/2006 | Kump .................. H01M 2/1205 29/623.1 |
| 7,326,489 B2 | | 2/2008 | Jones et al. |
| 8,323,811 B2 | | 12/2012 | Saito et al. |
| 2005/0208369 A1 | | 9/2005 | Puhlick et al. |

OTHER PUBLICATIONS

Cat-Vent, Philadelphia Scientific LLC, http://www.phlsci.com/product/2/17, Copyright 2009, 1 page.

* cited by examiner

VIBRATION RESISTANT VALVE ASSEMBLY FOR LEAD ACID BATTERIES

This application claims priority to U.S. Provisional Application No. 62/096,621, filed Dec. 24, 2014.

FIELD OF THE INVENTION

The invention is generally related to a battery valve assembly, and more specifically to a battery valve assembly for lead acid batteries.

BACKGROUND

Valve-regulated lead acid (VLRA) batteries, commonly referred to as sealed batteries, are rechargeable batteries that can be mounted in any orientation. Unlike conventional flooded cell batteries, which use liquid, aqueous sulfuric acid as an electrolyte, VRLA batteries primarily include gel cell and Absorbed Glass Mat (AGM) battery types. In a gel cell battery, the sulfuric acid electrolyte is immobilized in a gel form. In an AGM battery, a fiberglass mat is impregnated with the aqueous sulfuric acid electrolyte, which retains the absorbed electrolyte through capillary action.

Generally, when a battery cell discharges, lead-sulphate and water are produced as the lead and sulfuric acid undergo a chemical reaction. When the battery cell is subsequently charged, the lead-sulphate and water are converted back into lead and sulfuric acid. During the charging process, and especially under extreme conditions, hydrogen and oxygen gasses are created. To prevent damage to the battery cell, VRLA batteries have pressure release valves positioned in the battery cover. These pressure relief valves activate when internal pressure exceeds a predetermined level, venting hydrogen and oxygen gas.

In FIG. 1, a conventional pressure releasing valve assembly 10 is shown. The assembly 10 includes a body 11 having a flange 12 on a first end 11a, a threaded portion 13 on a second end 11b, and a receiving passageway (not shown) extending through the body 11 from the first end 11a to the second end 11b; and a pressure relief valve 14 positioned over the first end 11a of the receiving passageway 14. When installed on a VRLA battery cover (not shown), the threaded portion 13 is screwed into a complimentary valve assembly receiving space (not shown) disposed on the cover.

While the conventional pressure releasing valve assemblies 10 work effectively under normal operating conditions, batteries using the convention assembly 10 do not always pass IATA/DOT vibration testing, described in Battery Counsel International Standard BCIS-21. Under the IATA/DOT vibration test, the battery is subjected to significant levels of vibration in three orientations, whereby the battery must remain leak-free during the entire process. Typically, the conventional pressure releasing valve assembly fails in the inverted orientation, where electrolyte leakage is observed. Consequently, conventionally equipped VRLA batteries are not always permitted to be classified as IATA/DOT approved, meaning they are classified as dangerous materials, severely restricting air transport and subjecting them to hazardous materials regulations.

There is a need for a pressure releasing valve assembly that will permit a thus equipped VRLA battery to pass the IATA/DOT vibration test.

SUMMARY

A battery valve assembly has a body with a first end and an opposite second end. The body includes a receiving passageway extending through the body from the first end to the second end, and an elongated base positioned proximate to the second end. The valve assembly also includes a hydrophobic barrier.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
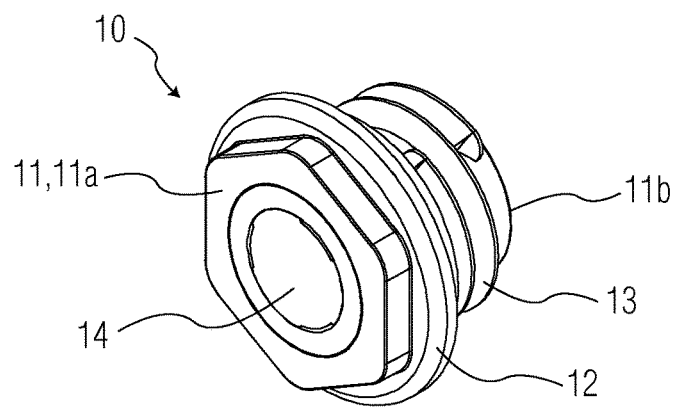
FIG. 1 is a perspective view of a conventional valve assembly.
Figure 2:
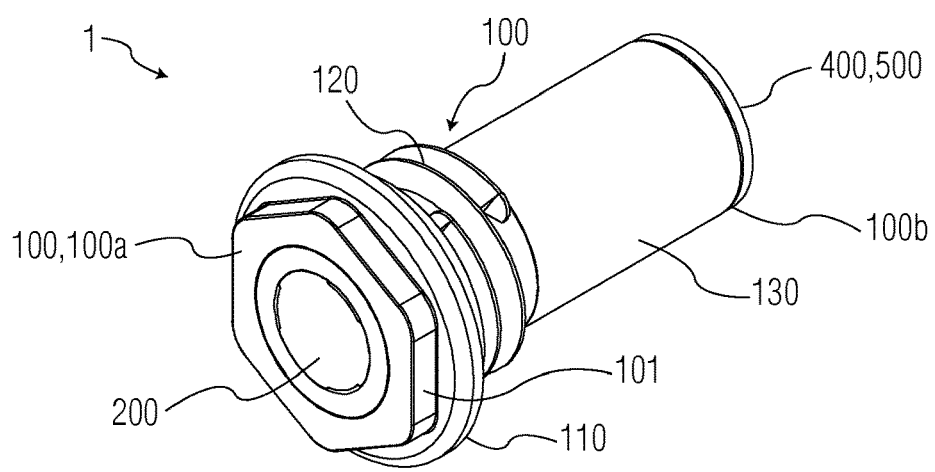
FIG. 2 is a perspective view of a battery valve assembly.
Figure 3:
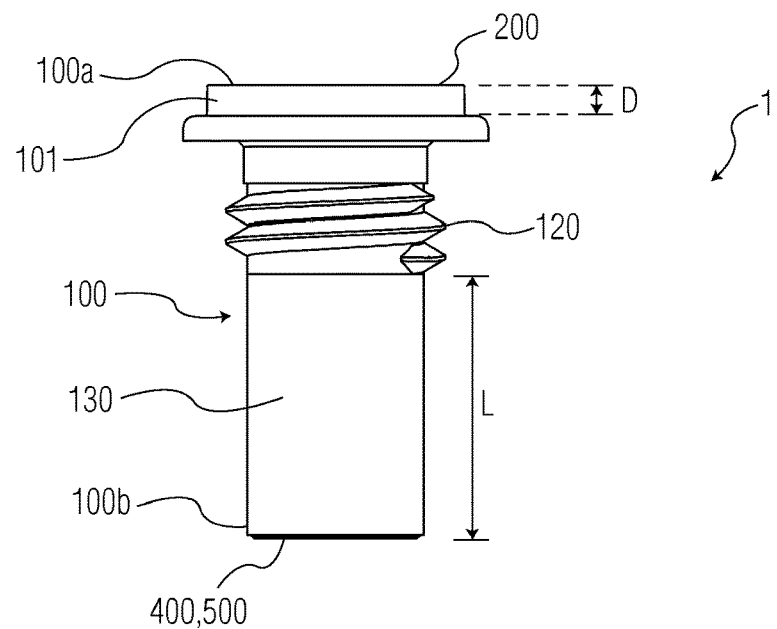
FIG. 3 is a side view of the battery valve assembly.

Embodiments of the invention will now be described with reference to FIGS. 2-11.

A battery valve assembly 1 has a valve body 100, a pressure relief valve 200, a seal 300, a hydrophobic barrier 400, and a barrier securing cap 500.

In the embodiments of FIGS. 2-5, the valve body 100 has a first end 100a and an opposite second end 100b. The valve body 100 includes a receiving passageway 140, a flange 110, a threaded portion 120, and a base 130. The valve body 100 may be substantially tubular in shape, or may be other shapes, such as squared, triangular, oval, rectangular, pentagonal, hexagonal, octagonal-like, or other common shapes known to those of ordinary skill in the art. The valve body 100 may be formed from a plastic material or other suitable materials that are chemically stable in the presence to a highly acidic electrolyte.

The receiving passageway 140 is positioned along a central portion of the valve body 100, extending continuously along a longitudinal axis through the valve body 100, from the first end 100a to the second end 100b. In an embodiment, the valve body 100 is tubular, with the first end 100a and the second end 100b being open, allowing fluid continuity from the second end 100b, through the receiving passageway 140, to the first end 100a. The receiving passageway 140 is defined by an inner surface of the valve body 100.

The flange 110 is disposed on an outer surface of the valve body 100, proximate to the first end 100a. The flange 110 extends radially outward from the outer surface, and is positioned circumferentially around the valve body 100. In an embodiment, the flange 110 is positioned a distance D from the first end 100a.

A torqueing mechanism 101 may optionally be positioned along the outer surface of the valve body 100, along the distance D portion. In an exemplary embodiment of FIGS. 2-4, the torqueing mechanism 101 is integrally formed from the valve body 100 in the shape of a hexagonal bolt head, although one of ordinary skill in the art would appreciate that other torqueing mechanisms may also be used.

The threaded portion 120 extends along the longitudinal axis of the valve body 100 from the flange 110. The threaded portion 120 is positioned on the outer surface of the valve body 100 along an approximate mid-portion of the valve body 100, between the first end 100a and second end 100b. The threaded portion 120 extends radially outward from the outer surface. The threaded portion 120 further extends circumferentially as a helix along a longitudinal axis of the valve body 100.

The base 130 extends for a length L along the longitudinal axis from the threaded portion 120. The length L is customizable depending on the type of battery and volume of electrolyte present. In an embodiment, the length L is equal to or greater than 0.5 inches. In an embodiment the length L is 0.5-2 inches. In another embodiment, the length L is 0.5-1.5 inches. In yet another embodiment, the length L is 0.5-1 inches. While various embodiments of length L have been described, one of ordinary skill in the art would appreciate that lengths L of less than 0.5 in and lengths L of greater than 2 in may also be used.

The pressure relief valve 200 may include conventional pressure relief valves known to those of ordinary skill in the art. The pressure relief valve 200 may be set to open at a predetermined pressure value; depending on the type of battery the pressure relief valve 200 is installed, and the application of the battery. When the valve body 100 is tubular, the pressure relief valve 200 has a complimentary circular shape with a diameter equal to or slightly greater than a diameter of the receiving passageway 140. In embodiments where the valve body 100 is other shapes, the pressure relief valve 200 has a complimentary shape equal or slightly greater than a diameter of the receiving passageway 140.

Figure 4:
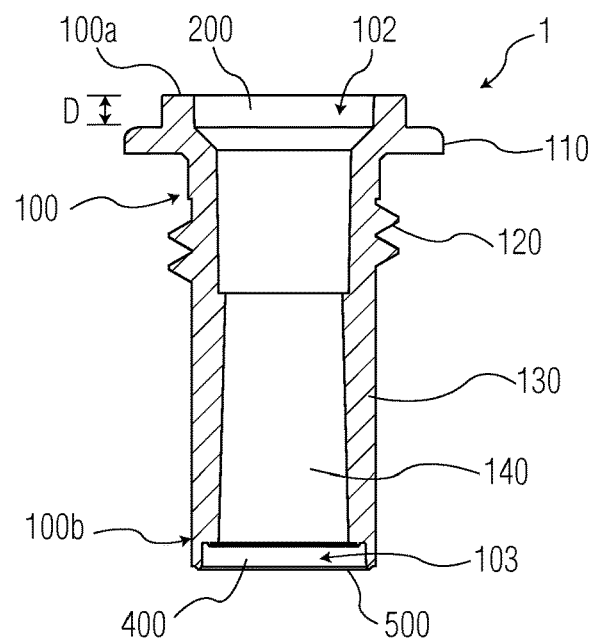
FIG. 4 is a sectional view of the battery valve assembly of FIG. 3.
Figure 5:
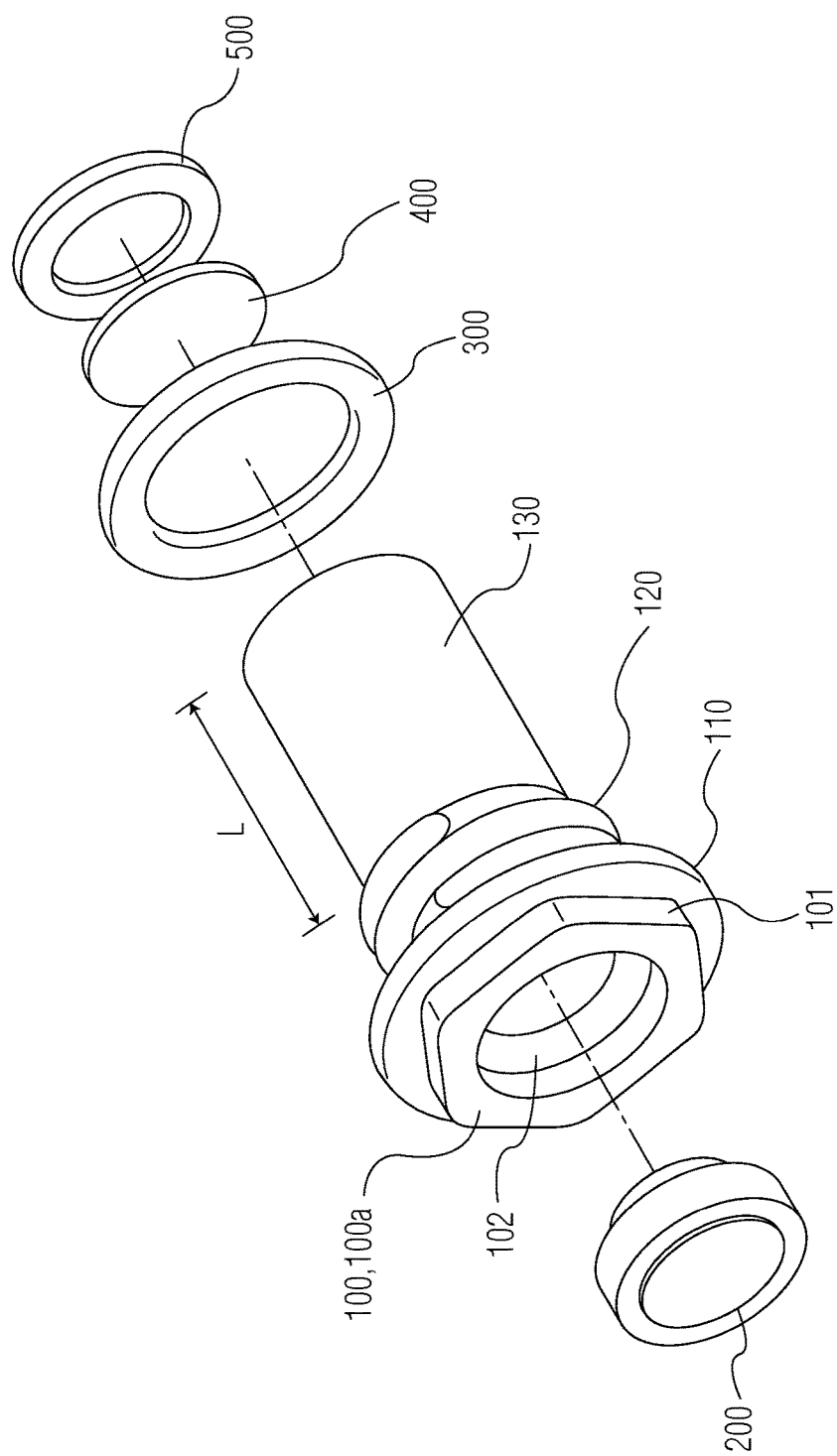
FIG. 5 is an exploded perspective view of the battery valve assembly.
Figure 6:
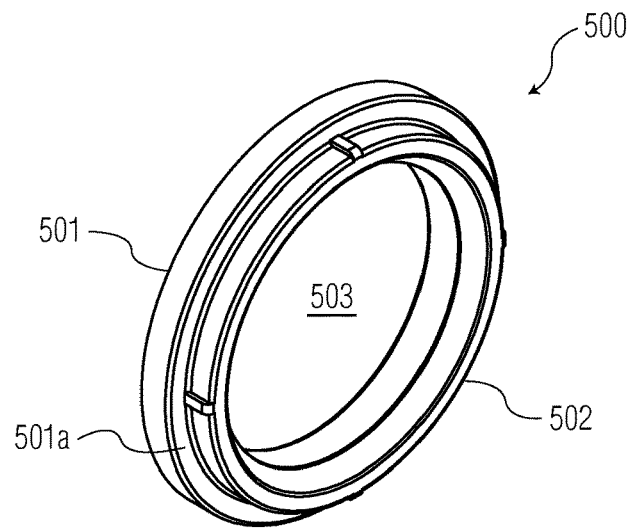
FIG. 6 is a perspective view of an inner facing side of a barrier cap.

In the exemplary embodiments of FIGS. 4 and 5, a portion of the inner surface of the valve body 100 on the first end 100a portion of the receiving passageway 140 is formed into a valve receiving space 102. The valve receiving space 102 is complimentary to that of the pressure relief valve 200. The pressure relief valve 200 may be inserted into the first end 100a of the receiving passageway 140. Upon positioning therein, the pressure relief valve 200 may be secured in a snap-fit manner, plastic welding, adhesive, or other common attachment mechanisms known to those of ordinary skill in the art, so long as a reliable seal is produced between the pressure relief valve 200 and the valve body 100.

In other embodiments, the pressure relief valve 200 may be positioned externally on the first end 100a of the valve body 100. For example, the pressure relief valve 200 may have a cap-like shape that is positioned over the outer surface of the first end 100a (not shown), and connected thereto by a snap-fit, a weld, an adhesive, or other common attachment mechanisms known to those of ordinary skill in the art, so long as a reliable seal is produced between the pressure relief valve 200 and the valve body 100.

The seal 300 may be made of conventional rubber sealing materials known to those of ordinary skill in the art. In an embodiment of FIG. 5, when the valve body 100 is tubular, the seal 300 is formed as an O-ring having an internal diameter of less than or equal to an outer diameter of the valve body 100. The seal 300 is positioned on the valve body 100 by sliding the seal over the second end 100b, along the longitudinal axis, and over the threaded portion 120 until the seal 300 abuts a second end facing surface of the flange 110. In embodiments where the valve body 100 is a shape other than tubular, one of ordinary skill in the art would appreciate that the shape of the seal 300 will be complimentary, such that the seal 300 can be fit over the outer surface of the valve body 100, and abut the second end facing surface of the flange 110.

The hydrophobic barrier 400 is formed in approximate disk shape when the valve body 100 is tubular. The hydrophobic barrier 400 is made from a suitable material that is gas permeable while being non-permeable to aqueous based electrolytes. In an embodiment, the hydrophobic barrier 400 is made from a suitable gas permeable, hydrophobic material that is chemically stable in the presence of the highly acidic electrolyte. In an embodiment the hydrophobic barrier 400 is a fluorinated membrane material, such as polytetrafluoroethylene (PTFE), polyvinylfluoride (PVF), perfluoroalkoxy polymer (PFA), fluorinated ethylene-propylene (FEP), perfluoropolyether (PFPE), polyvinylidene fluoride (PVDF), or other suitable fluorinated membrane materials that are gas permeable while being non-permeable to aqueous base electrolytes. In an embodiment, the hydrophobic barrier 400 is made of PTFE.

In an embodiment of FIG. 4, a portion of the inner surface of the valve body 100 on a second end 100b portion of the receiving passageway 140 is formed into a barrier receiving space 103. The shape of barrier receiving space 103 is complimentary to that of the hydrophobic barrier 400. In the embodiment of FIG. 4, the inner surface of the receiving passageway 140 comprising the barrier receiving space 103 has an inner surface diameter that is greater than the inner surface diameter of the receiving passageway 140. The inner surface diameter of the barrier receiving space 103 is approximately equal to or less than a diameter of an outer circumferential edge of the hydrophobic barrier 400. The hydrophobic barrier 400 may therefore be inserted into the barrier receiving space 103 on second end 100b to form a hydrophobic seal over the opening of the second end 100b.

In an embodiment (not shown), the diameter of the outer circumferential edge of hydrophobic barrier 400 is approximately equal to the diameter of the outer surface of the valve body 100, and is positioned against an outer surface of the second end 100b to form the hydrophobic seal. In another embodiment (not shown), when the valve body 100 is formed into a shape other than tubular, the shape of the hydrophobic barrier 400 and the barrier receiving space 103 are complimentary, where the hydrophobic barrier 400 can be inserted into the barrier receiving space 103 or positioned against the outer surface of the second end 100b.

The barrier retaining cap 500 has a capping flange 501, a retaining body 502 and a receiving passageway 503. When the valve body 100 is tubular, the capping flange 501 and retaining body 502 are annular in shape. The flange 501 is continuously positioned along an outer facing end of the retaining body 502, radially extending outward from an outer circumferential surface of the retaining body 502. An outer circumferential surface of the capping flange 501 has a diameter that is approximately equal to the diameter of the outer circumferential surface of the valve body 100. A second end facing surface 501a of the capping flange 501 has a width approximately equal to a distance between the inner and outer surfaces of the valve base 130 on the second end 100b. More specifically, when the barrier retaining cap 500 is positioned on the second end 100b, the outer circumferential surfaces of the valve body 100 and capping flange 501 are flush.

The outer circumferential surface of the retaining body 502 has a diameter that is less than the outer circumferential surface of the capping flange 501. The diameter of the outer circumferential surface of the retaining body 502 is approximately equal to the inner surface diameter of the barrier receiving space 103. When the barrier retaining cap 500 is positioned on the second end 100b and the second end facing surface 501a of the capping flange 501 abuts the second end 100b of the valve body 100, the retaining body 502 extends inward a distance into the barrier receiving space 103.

When the hydrophobic barrier 400 is positioned in the barrier receiving space 103, as the barrier retaining cap 500 is positioned on the second end 100b of the valve body, the retaining body 502 contacts the hydrophobic barrier 400. The retaining body 502 compresses an annular area in which the retaining body 502 contacts the hydrophobic barrier 400 against the inner surface of the receiving passageway 140 forming the barrier receiving space 103, thus creating a seal along a peripheral edge of the hydrophobic barrier.

The receiving passageway 503 of the barrier retaining cap 500 is an opening in a central portion of the barrier retaining cap 500. The receiving passageway 503 is defined by an inner circumferential surface of the retaining body 502. In an embodiment the receiving passageway 503 has a diameter complementary to that of the receiving passageway 140 of the valve body 100. When the barrier retaining cap 500 is connected to the second end 100b of the extended base 130, the receiving passageways 503, 140 are complementary such that fluid continuity between the first end 100a and the second end 100b is conserved.

The barrier retaining cap 500 is fixed to the second end 100b through a weld, a snap fit, or an adhesive, or other common attachment mechanisms known to those of ordinary skill in the art.

In an embodiment (not shown), when the valve body 100 is formed into a shape other than tubular, the shape of the barrier retaining cap 500 will be complimentary to the shape of the barrier receiving space 103, such that the retaining body 502 can be inserted into the barrier receiving space 103 to form a seal along the peripheral edge of the hydrophobic barrier 400.

Assembly of the battery valve assembly 1 will now be described with reference to FIGS. 2-6.

The pressure relief valve 200 is inserted into the first end 100a of the receiving passageway 140. The pressure relief valve 200 is then positioned in the complimentary valve receiving space 102.

The O-ring seal 300 is positioned on the outer surface of the valve body 100, on the second end 100b of the extended base 130. The O-ring seal 300 is then slideably displaced along the longitudinal axis towards the first end 100a and the flange 110 until the O-ring seal 300 abuts the second end facing surface of the flange 110.

The hydrophobic barrier 400 is inserted into the second end 100b of the receiving passageway 140, and positioned in the complimentary barrier receiving space 103. The retaining body 502 of the barrier retaining cap 500 is then inserted into the second end 100b of the receiving passageway 140, and slideably displaced inward until the retaining body 502 contacts the hydrophobic barrier 400. An inward force is applied to the barrier retaining cap 500 until the second end facing surface 501a of the capping flange 501 contacts the second end 100b of the valve body 100. Consequently, the barrier retaining cap 500 retains the hydrophobic barrier 400 on the second end 100b of the receiving passageway 140.

Figure 7:
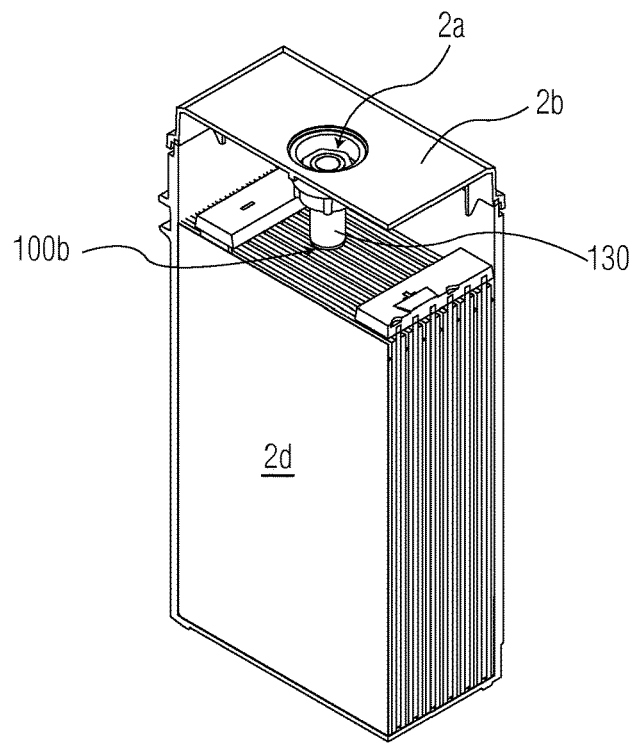
FIG. 7 is a partial sectional view of the battery valve assembly positioned in a battery cover.
Figure 8:
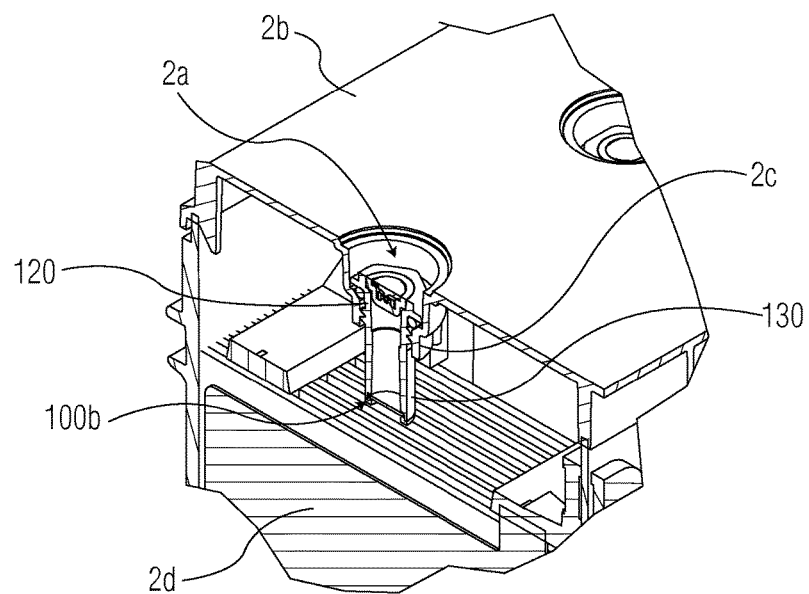
FIG. 8 is an enlarged sectional view of a portion of FIG. 7.
Figure 9:
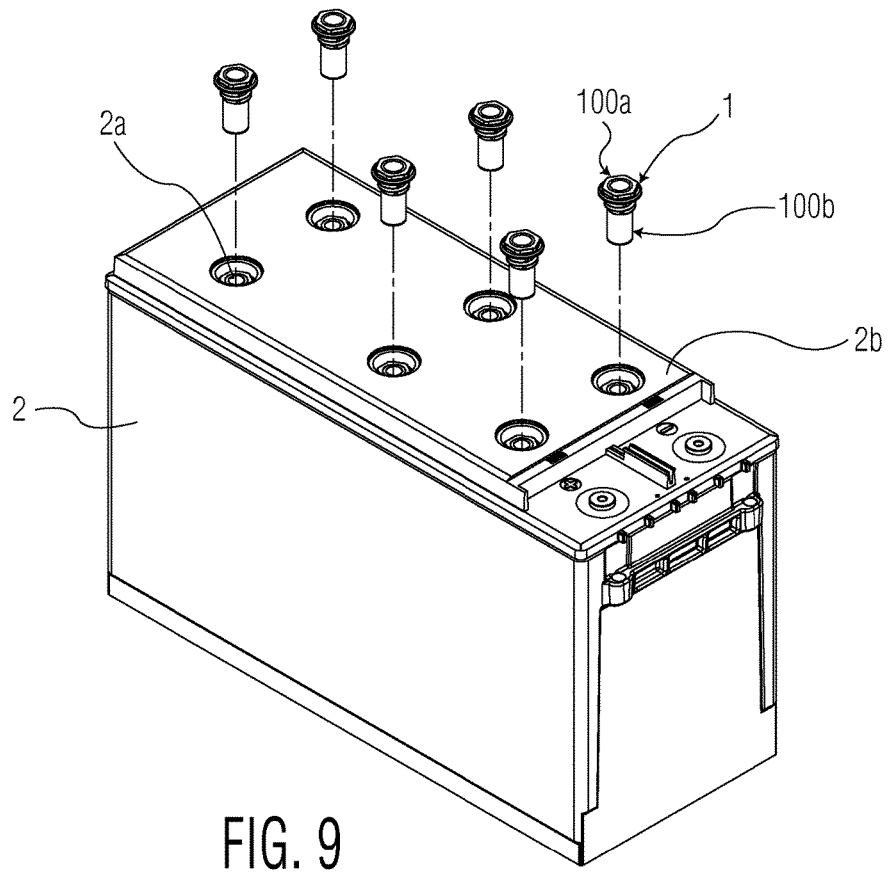
FIG. 9 is a partially exploded perspective view of a plurality of battery valve assemblies and a VRLA battery having a plurality of complimentary valve assembly receiving spaces positioned on a cover.

Installation of the battery valve assembly 1 into a battery 2 will now be described with reference to FIGS. 7-9.

To install the battery valve assembly 1 into the battery 2, the second end 100b of the valve body 100, having the hydrophobic barrier 400 and barrier retaining cap 500, is inserted into a valve assembly receiving passageway 2a positioned in a battery cover 2b. Complementary threads 2c disposed along an inner surface of the valve assembly receiving passageway 2a contact and engage the threaded portion 120 of the valve body 100. The valve assembly 1 is then screwed into the battery cover 2b until the O-ring seal 300 contacts an outer surface of the battery cover 2b. The valve assembly 1 is tightened such that the O-ring seal is compressed between the outer surface of the battery cover 2b and the second end facing surface of the flange 110 to form a seal therebetween. The battery valve assembly 1 is thus connected to the battery cover 2b in a sealed manner, being positioned within the valve assembly receiving passageway 2a.

In an embodiment, a plurality of battery valve assemblies 1 may be installed in the battery cover 2b, with one or two assemblies 1 being positioned within a battery receiving chamber (not labeled) having a cell of battery plates 2d. The extended base 130 protrudes the length L inward from the battery cover 2b, while the pressure relief valve 200 is positioned outside the battery 2.

Figure 10:
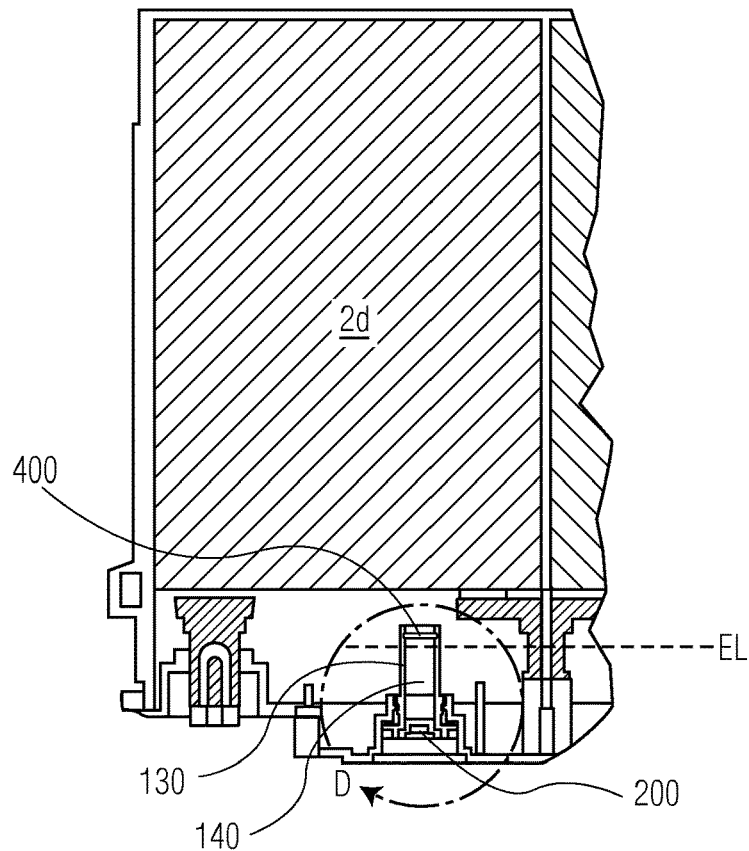
FIG. 10 is an inverted sectional view of the battery valve assembly installed on the VRLA battery.
Figure 11:
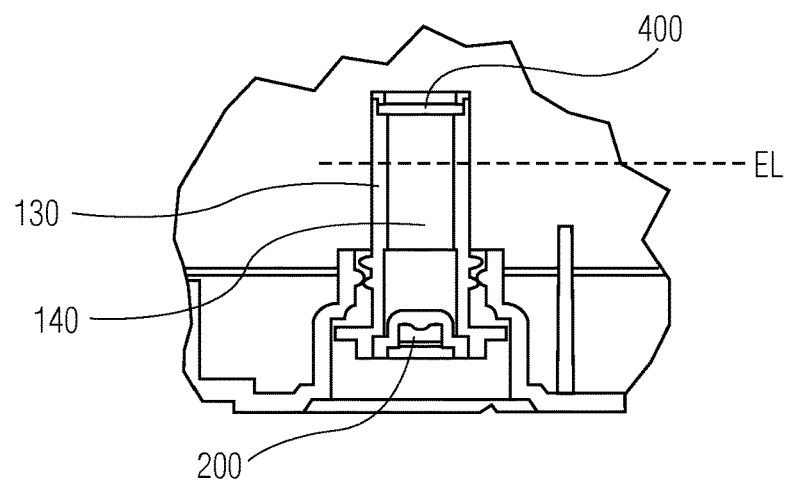
FIG. 11 is a sectional view of portion D in FIG. 10.

In the embodiments of FIGS. 10 and 11, when the battery 2 is inverted and subjected to vibrational forces, such as when undergoing IATA/DOT vibrational testing, electrolyte begins to fill the battery cover 2b. See for example, an exemplary electrolyte level EL. The extended length L of the base 130 is generally greater than the electrolyte level EL in the battery cover 2b. Therefore the electrolyte does not leak out of the battery 2 through the receiving passageway 140 and pressure relief valve 200. In the event that the electrolyte level EL exceeds the extended length of the base 130, the hydrophobic barrier 400 blocks the electrolyte from entering into the receiving passageway 140 and leaking out of the battery 2 through the pressure relief valve 200.

However, while the hydrophobic barrier 400 blocks the electrolyte, the gas permeable characteristic of the hydrophobic barrier 400 still permits generated hydrogen and oxygen gas to permeate into the receiving passageway 140 to be vented through the pressure relief valve 200.

Although the above embodiments show and describe a battery valve assembly 1 as an example, one of ordinary skill in the art would appreciate that changes or modifications may be made without departing from the principles and spirit of the disclosure.

What is claimed is:

1. A battery valve assembly for a battery, comprising:
an elongated body having a first end and an opposite second end with a receiving passageway extending centrally through the body from the first end to the second end and an extended base positioned proximate to the second end;
a hydrophobic barrier positioned within the extended base at the second end and disposed within the battery interior of an innermost surface of a battery cover of the battery; and
a pressure relief valve positioned at the first end of the body and disposed exterior of the battery, the hydrophobic barrier positioned before the pressure relief valve in a fluid path extending from an interior of the battery to an exterior of the battery.

2. The battery valve assembly of claim 1, wherein the hydrophobic barrier is formed from a gas permeable, fluorinated membrane material.

3. The battery valve assembly of claim 1, wherein the hydrophobic barrier covers an opening of the receiving passageway on the second end to form a hydrophobic seal.

4. The battery valve assembly of claim 3, wherein the hydrophobic barrier is positioned in a complimentary barrier receiving space located in a portion of the receiving passageway proximate to the second end of the body.

5. The battery valve assembly of claim 3, further comprising a barrier retaining cap positioned on the second end of the body.

6. The battery valve assembly of claim 5, wherein the barrier retaining cap is complementary to the second end of the body, the barrier retaining cap having a receiving passageway that extends continuously with the receiving passageway of the body.

7. The battery valve assembly of claim 5, wherein the barrier retaining cap fixes the hydrophobic barrier to the second end of the body.

8. The battery valve assembly of claim 1, wherein the elongated body further comprises a flange positioned proximate to the first end.

9. The battery valve assembly of claim 8, wherein the elongated body further comprises a threaded portion positioned adjacent to the flange, between the flange and the second end of the body.

10. The battery valve assembly of claim 1, wherein the pressure relief valve covers the first end of the receiving passageway.

11. The battery valve assembly of claim 1, wherein the body is tubular.

12. The battery valve assembly of claim 1, wherein the body further comprises:
 a flange positioned on the first end;
 a threaded portion extending from the flange towards the second end, and being continuously connected to the elongated base.

13. The battery valve assembly of claim 12, further comprising a seal positioned continuously around the body and abutting a second end facing surface of the flange.

14. A battery valve assembly for a battery, comprising:
 a body having
  a flange on a first end,
  a threaded mid-portion,
  an elongated base on a second end, and
  a receiving passageway extending through the body from the first end to the second end, the first and second ends of the receiving passageway are open, allowing fluid continuity between the first and second ends of the body;
 a pressure relief valve positioned at the first end of the receiving passageway and disposed exterior of the battery;
 a seal;
 a hydrophobic barrier positioned within the body at the second end of the receiving passageway and disposed within the battery interior of an innermost surface of a battery cover of the battery, the hydrophobic barrier positioned before the pressure relief valve in a fluid path extending from an interior of the battery to an exterior of the battery; and
 a barrier retaining cap.

15. A lead acid battery comprising:
 a battery cover having at least one valve assembly receiving passageway;
 at least one battery valve assembly positioned in each valve assembly receiving passageway, each valve assembly having
  a body having a first end and an opposite second end with
   a flange on a first end and abutting against an outer surface of the battery cover,
   a threaded mid-portion engaged with complimentary threads disposed along the valve assembly receiving passageway,
   an elongated base extending inward from the threaded mid-portion into the battery;
  a hydrophobic barrier positioned in the battery on the second end of the elongated base;
  a receiving passageway extending through the body from the first end to the second end such that fluid continuity between an interior and an exterior of the battery is established; and
  a pressure relief valve positioned at the first end of the body, the hydrophobic barrier positioned before the pressure relief valve in a fluid path extending from the interior of the battery to the exterior of the battery, and when the battery is positioned upside down on the battery cover, an electrolyte level in the battery cover is less than the length of the elongated base.

* * * * *